United States Patent [19]

Sanzaro

[11] Patent Number: 4,470,357

[45] Date of Patent: Sep. 11, 1984

[54] LAMINATED PANELS FOR VAULT CONSTRUCTION

[76] Inventor: Caesar Sanzaro, Pond Meadow Rd., Westbrook, Conn. 06498

[21] Appl. No.: 458,211

[22] Filed: Jan. 17, 1983

[51] Int. Cl.³ .............................................. E04B 2/02
[52] U.S. Cl. ...................................... 109/84; 109/82; 428/703
[58] Field of Search ....................... 109/76, 78, 80, 82, 109/83, 84, 85; 428/703, 511, 528

[56] References Cited

U.S. PATENT DOCUMENTS

| 1,048,923 | 12/1912 | Wheeler | 109/80 |
| 1,879,319 | 9/1932 | Kleitz | 109/80 |
| 2,218,965 | 10/1940 | Young et al. | 109/80 |
| 3,453,974 | 7/1969 | Gerard | 109/83 |
| 3,828,699 | 8/1974 | Bowen | 109/80 |

FOREIGN PATENT DOCUMENTS

| 53036 | 6/1924 | Fed. Rep. of Germany | 109/80 |
| 449040 | 8/1927 | Fed. Rep. of Germany | 109/83 |
| 110699 | 7/1925 | Switzerland | 109/80 |
| 2081335 | 2/1982 | United Kingdom | 109/82 |

*Primary Examiner*—Gene Mancene
*Assistant Examiner*—John G. Weiss
*Attorney, Agent, or Firm*—Charles E. Temko

[57] ABSTRACT

An improved laminated panel construction for use in the construction of vaults in existing building structures, including outer laminae of steel sheeting with inner laminae of a dense hard wood such as oak, carbide abrasive, and concrete aggregate. The laminate is formed by bonding with epoxy adhesives in which the abrasive in particulate form has been suspended. Certain of the laminae are separated by lengths of metal forming a channel to form an interstice which is filled with the concrete aggregate after formation. The panels are formed with lap joints for assembly, the lap joints being covered with metal batten strips welded to the exposed surfaces of the outermost laminae.

1 Claim, 4 Drawing Figures

LAMINATED PANELS FOR VAULT CONSTRUCTION

BACKGROUND OF THE INVENTION

This invention relates generally to the field of vault construction, and more particularly to an improved laminated wall construction forming panels which are interconnected to form an enclosure. Constructions of this general type are known in the art, and the invention lies in specific constructional details which permit the obtaining of improved lightness of weight and lowered cost of construction, without sacrificing resistance to penetration.

In my copending application, Ser. No. 6/325,135, filed Nov. 27, 1981, there is disclosed a panel construction including laminae of steel sheets, plywood, steel mesh, and concrete aggregate having suspended abrasive particles therein.

This construction has proven effective from the standpoint of resistance to penetration by cutting torches, impact hammers, power saws and carbide drills. Tests indicate that the attack time required to penetrate a five layer panel is comparable to that required to penetrate a wall constructed of one-inch thick steel plates plus twelve inches of reinforced concrete block. Similarly, a three layer laminated panel requires an attack time equal to that of a wall formed of three quarter inch thick steel backed by eight inches of reinforced concrete block.

More recently, I have found that other materials offer superior qualities at comparable lesser cost. Oak, particularly red oak, planking, because of the inherent density of the wood has proven superior to plywood. A mixture of vermiculite and cement is easily poured into interstices more readily than concrete aggregate, and tends to be substantially lighter in weight without sacrificing fire resistance. Rather than mix a carbide abrasive into the concrete, it can be applied to epoxy adhesive layers which interconnect the laminae by sprinkling the adhesive layer, thereby reducing the amount of abrasive necessary to be provided, and disposing it in successive layers which come into service as the panel is penetrated.

SUMMARY OF THE INVENTION

Briefly stated, the invention contemplates the provision of an improved lightweight panel construction suitable for the fabrication of vaults in existing building constructions of the type described in the above mentioned copending application, in which layers of dense hardwood are bonded together using epoxy adhesives which are impregnated with a carbide type abrasive. A void is created in a medially disposed area of the panel by welding channel iron to the surfaces of steel plates which are bonded to the wood laminae, and the void is filled with a mixture of vermiculite and cement to form a fireproofing layer of very light weight. In a second embodiment providing superior protection, two interstices are provided instead of one, and the interstices are filled with deformed steel rods which are surrounded by either the vermiculite-cement mixture, or a standard concrete aggregate including sand and stone.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENTS

Figure 1:
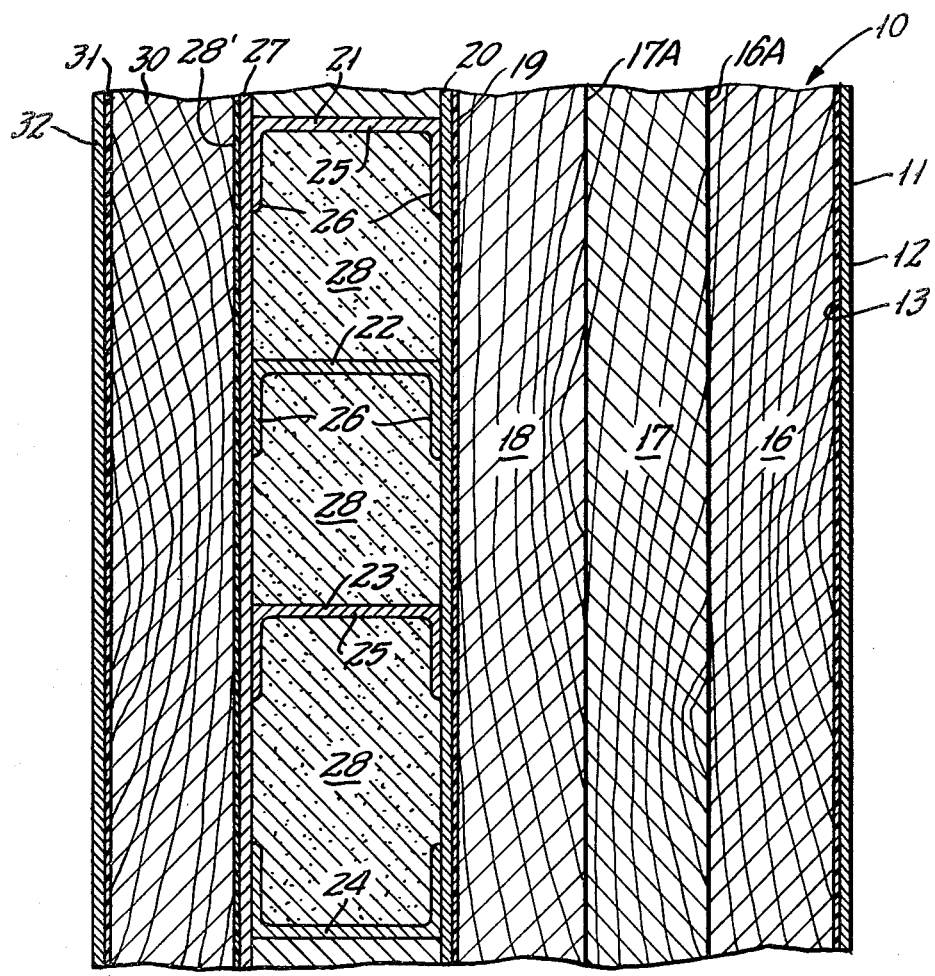
FIG. 1 is a fragmentary transverse sectional view of a first embodiment of the invention, showing a single laminated panel.

In accordance with the first embodiment of the invention, best understood from a consideration of FIG. 1, and generally indicated by reference character 10, the structure comprises: a first steel lamina 11, preferably of 0.10 gauge thickness, having an outer exposed surface 12 and an inner surface 13. The inner surface is covered with an epoxy layer approximately three thirty seconds of an inch thick which is impregnated with emerundum particulate abrasive, which can be sprayed or rolled on. Reference characters 16, 17, and 18, represent a series of one and one half inch thick hardwood members, preferably of red oak, each being interconnected to the preceding one by a thin layer of epoxy at 16A and 17A. Reference character 19 is a thicker emerundum impregnated layer of epoxy adhesive which is used to secure a second inner steel lamina of 0.14 gauge thickness.

Secured to the opposite side of the lamina 20 are a plurality of channel iron members 21, 22, 23, and 24, each including a base 25 and a pair of side members 26, one half of which are welded to the lamina 20, and the remaining half of which are welded to a third steel lamina 27. The interstice 28 formed thereby is filled with a mixture of cement and vermiculite to form a fireproof layer.

On the opposite side of the lamina 27 is a further layer of epoxy 28 followed by a layer 30 of one and one half inch hardwood, another layer 31 of epoxy and emerundum, and a fourth outer steel lamina 32 of 0.10 gauge thickness.

Figure 2:
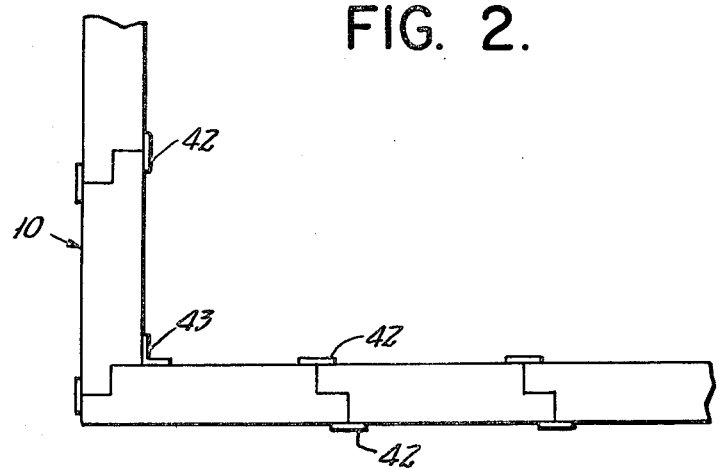
FIG. 2 is a fragmentary plan view showing the interconnection of a plurality of panels shown in FIG. 1 to form a wall of an enclosure.
Figure 3:
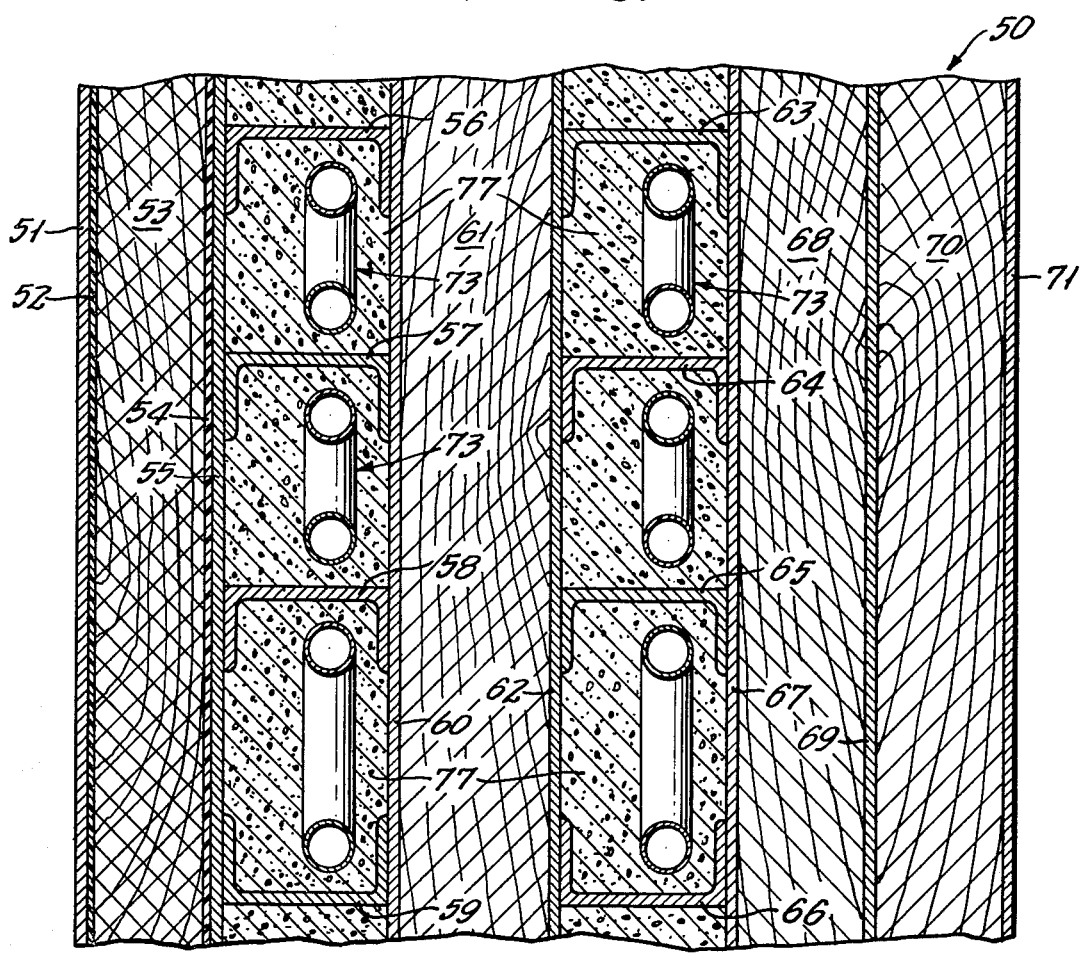
FIG. 3 is a fragmentary transverse sectional view corresponding to that seen in FIG. 1, but showing a second embodiment of the invention.

Referring to FIG. 2, the individual panels 10 are provided with lapped side edges 40 and are secured together to form a wall by tack welding (not shown). The welded edges are protected by a three inch wide batten strip 42 which are welded in place, and, preferably the corners are similarly protected by an angle iron 43. Tack welding at approximately twelve inch intervals along the invals is adequate.

In preferred form, panels manufactured in accordance with the first embodiment have a maximum width of three feet and a maximum height of ten feet. A minimum width is six inches and a minimum height is two feet.

Turning now to the second embodiment, generally indicated by reference character 50, there is disclosed a somewhat heavier and stronger construction manufactured according to the same principles. The embodiment 50 includes an outer steel lamina 51, the emerundum and epoxy layer 52, a one and one half inch hardwood layer 53, a subsequent epoxy layer 54 and a 0.14 gauge inner steel lamina 55. A first interstice is formed by two inch channel irons 56, 57, 58, and 59, which are also welded to an inner 0.14 gauge steel lamina 60. A similar construction is separated by a one and one half inch hardwood panel 61, and includes a 0.14 gauge steel lamina 62, enclosed channel irons 63, 64, 65, and 66, and an additional 0.14 gauge steel lamina 67. This is followed by a one and one half inch hardwood panel 68, a 0.14 gauge steel lamina 69, another one and one half inch hardwood panel 70, and a 0.10 gauge outer lamina 71.

Figure 4:
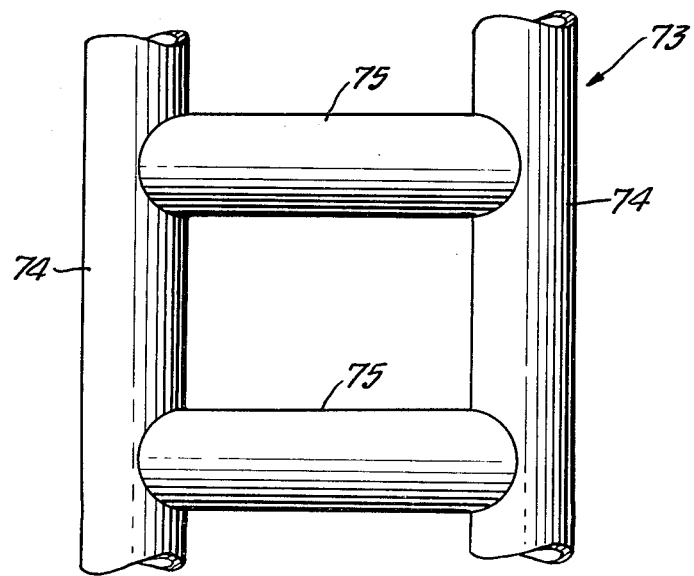
FIG. 4 is a fragmentary view in elevation showing reinforcing steel rod structure forming a part of the second embodiment.

Prior to filling the interstices formed by the channel irons, a deformed metal grill is inserted and held in position by welding (not shown). FIG. 4 illustrates the grill or grid, generally indicated by reference character 73, and including vertical members 74 and transverse members 75.

Instead of vermiculite, the filler 77 may be conventional sand, stone, and cement aggregate. The result is a thicker, stronger panel of heavier weight.

Assembly is similar to that employed in the case of the first embodiment, including batten strips which are tack welded over the joints. Panels made in accordance with the second embodiment preferably have a maximum width of three feet, and maximum height of ten feet, a minimum width of six inches, and a minimum height of two feet.

It will thus be seen that I have invented novel and highly useful improvements in laminated panels for vault construction in which, as contrasted with my prior construction, plywood panels have been substituted by solid hardwood, preferably red oak, and the abrasive material is incorporated into layers of epoxy adhesive which maintain the various laminae in integrated condition.

I wish it to be understood that I do not consider the invention limited to the precise details of structure shown and set forth in this specification, for obvious modifications will occur to those skilled in the art to which the invention pertains.

I claim:

1. In an improved wall construction for use in a vault or similar enclosure including a laminate of metallic and non-metallic layers, the improvement comprising: said non-metallic layers being in the form of plural sheets of dense non-laminated hardwood, each bonded to an adjacent layer using an epoxy adhesive; at least some of said non-metallic layers being adhered to metallic layers using an epoxy adhesive impregnated with particulate abrasive; at least one pair of metallic layers being separated to form an interstice, and a fireproof aggregate comprising cement and vermiculite filling said interstice; spacing means including channel-shaped pieces of metal welded to opposed surfaces of said metallic layers; and a plurality of metallic rods disposed within said interstices and welded to said channel-shaped pieces, said rods being surrounded by said aggregate.

* * * * *